(No Model.)
C. GEIER.
LUBRICATOR.
No. 597,577.　　　　　　　　　Patented Jan. 18, 1898.
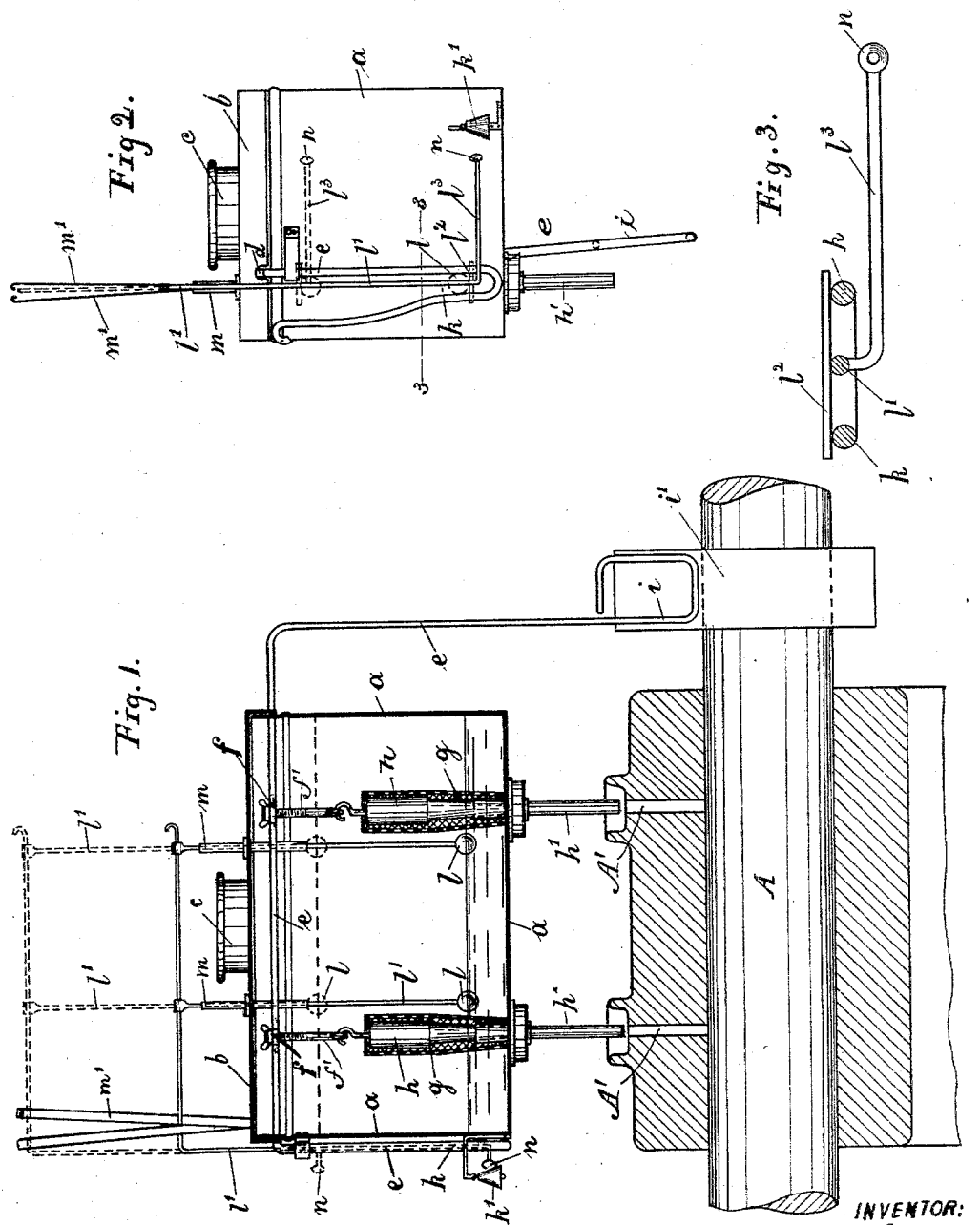
WITNESSES:
INVENTOR:
C. Geier
BY
ATTORNEYS.

UNITED STATES PATENT OFFICE.

CARL GEIER, OF OBERLANGENBIELAU, GERMANY.

LUBRICATOR.

SPECIFICATION forming part of Letters Patent No. 597,577, dated January 18, 1898.

Application filed May 13, 1896. Serial No. 591,363. (No model.) Patented in England June 6, 1896, No. 8,340.

*To all whom it may concern:*

Be it known that I, CARL GEIER, of Oberlangenbielau, Prussia, Germany, have invented a new and Improved Self-Oiler for Machinery, (which has been patented in England, No. 8,340, dated June 6, 1896,) of which the following is a full, clear, and exact description.

My invention relates to an apparatus for supplying a lubricant to machinery in motion, and has for its object to make the supply of the lubricant dependent on the speed of the parts, to provide means whereby the lubricant will be supplied at regular intervals so as to keep the shaft or other part constantly lubricated, and to operate a suitable alarm whenever the supply of the lubricant in the storage-tank has become nearly exhausted.

To these ends my invention consists in the particular construction and arrangement of parts hereinafter described and claimed.

Reference is to be had to the accompanying drawings, forming a part of this specification, in which similar characters of reference indicate corresponding parts in all the views.

Figure 1 is a sectional elevation showing the application of my invention to a shaft. Fig. 2 is an end view of the said device with parts omitted. Fig. 3 is a detail section on the line 3 3 of Fig. 2.

A indicates the shaft to be lubricated, the bearings of which are provided with suitable oil-supply channels A'. At a level above said shaft is located the tank $a$, constructed of suitable material and provided in its top $b$ with an opening $c$, through which the tank may be filled. At each end of the tank a notch $d$ is provided between the tank proper and its cover or top, and said notches serve as bearings for a horizontally-arranged wire or rock-shaft $e$. Said wire is provided within the tank $a$ with two eyes $f$, each supporting a screw $f'$, formed at its lower end with a hook or eye and receiving at its upper end a winged nut serving to adjust the screws vertically. From each of the said screws is suspended a lead plunger or piston $h$, whose lower end is tapering or conical and fits into the upper end of a lubricating-tube $h'$, adapted to feed the lubricant in drops to the oil-channels A'.

A sieve $g$ surrounds the plunger $h$, so that the aperture closed by said plunger may not become clogged. Exteriorly of the tank $a$ the rod $e$ is curved at one end to form a crank or frame $i$, which is adapted to be operated by an eccentric on the shaft A or by a cam or equivalent device. Thus while the shaft is rotating the rod $e$ will constantly receive a rocking motion. In consequence thereof the plungers $h$ will be alternately raised and lowered, thus periodically uncovering the outlets leading from the tank $a$ to the tubes $h'$, and thus the shaft A will receive approximately the same supply of lubricant at each revolution, and as the motion of the plunger $h$ depends on that of the shaft the supply of the lubricant will be proportioned to the rotary speed.

In order to automatically give an alarm when the supply of the lubricant in the tank is nearly exhausted, I provide the following device: The end of the rod $e$ opposite to that carrying the frame $i$ is extended downwardly along the end of the tank and then returned to form a crank $k$, composed of two runs of the rod. Between the runs of the rod forming this crank is received a wire $l'$, which extends upwardly to pass between yielding arms $m'$ and then extends horizontally over the top of the tank to finally pass downward into the same in two branches, terminating in floats $l$, adapted to rise and fall with the liquid in the tank. Tubes $m$ serve to guide the wires $l'$ where they pass through the top $b$ of the tank. The outer end of the wire $l'$, which fits between the runs of the rod forming the crank $k$ of the wires $l$, has its lower end fixed to a transverse bar $l^2$, the ends of which extend along the inner sides of the runs of the crank when the bar is in the position shown by full lines in the drawings. Fixed to the rod $l'$ is a rod $l^3$, running horizontally to the bell $k'$ and carrying a clapper $n'$, engaging and sounding the bell. When the crank $k$ rocks and when the lower end of the rod $l'$ has been moved to the position shown in Fig. 2, the runs of the crank $k$ will alternately strike against the rod $l'$ and swing the same, moving at the same time the rod $l^3$ and sounding the bell. During this operation the bar $l^2$ serves to guide the parts in their movement.

When the tank is nearly full, as indicated by dotted lines in the drawings, the hammer $n$ will be raised to such a position that although it receives a reciprocating or oscillating motion from the rocking crank $k$ it will not have any effect on the bell $k'$. As the oil flows out of the tank A the floats $l$ sink toward the bottom of the tank, and the hammer $n$ follows them in this movement. Finally when the supply is nearly exhausted the hammer will come to the same level as the bell $k'$, and then the rocking movement of the crank $k$ will cause the hammer to continuously strike the bell, thereby calling the attendant's attention to the fact that the tank is nearly empty.

Having thus described my invention, I claim as new and desire to secure by Letters Patent—

1. In a lubricating apparatus, the combination with a tank having an outlet-orifice, of a rock-shaft, a plunger capable of closing the outlet-orifice and having connection with the rock-shaft by which the plunger is moved, a crank carried by the rock-shaft, a rod movable vertically along the crank and vibrating by engagement with the outer end thereof, a hammer connected to the rod, a bell carried by the tank, and a float within the tank and connected to the rod to move the same, substantially as described.

2. The combination with a tank, of a rock-shaft, a crank on the rock-shaft, a rod vibrated by and slidable longitudinally along the crank, a hammer carried by the rod, a bell carried by the tank, and a float within the tank and connected to the rod, substantially as described.

3. The combination with a tank, of a float within the tank, a rod connected to the float and slidable through the tank, a second rod exterior of the tank and connected to the first rod, means for vibrating the said exterior rod, a hammer carried by the exterior rod, and a bell carried by the tank, substantially as described.

4. The combination with a tank, having an outlet-orifice, of a rock-shaft mounted in the tank and having each end extending beyond the same, a crank at each end of the rock-shaft, a plunger within the tank and capable of closing the outlet-orifice thereof, a connection between the plunger and the rock-shaft, a float within the tank, a rod connected to the float and movable through the tank, an exterior rod connected to the first rod and being vibrated by and slidable along one of the cranks, a hammer carried by the said exterior rod, and a bell carried by the tank, substantially as described.

5. The combination with a tank, of a bell carried thereon, a crank mounted to swing on the tank, means for swinging the crank, a clapper, means carrying the clapper, such means being vibrated by and movable along the crank, and a float connected with the said means, substantially as described.

6. The combination with a tank, of a rock-shaft mounted thereon, a crank carried by the rock-shaft, means for swinging the crank, a rod vibrated by and movable along the crank, the rod extending upwardly and thence horizontally over the tank, a hammer carried by the lower portion of the rod, a bell carried by the tank, a float located within the tank and connected with the horizontal portion of the rod, and two yielding arms between which the horizontal portion of the rod passes, said yielding arms being carried by the tank, substantially as described.

In witness whereof I hereunto set my hand in presence of two witnesses.

CARL GEIER.

Witnesses:
MARTIN MEYER,
ERNST KAY.